(12) United States Patent
Fuente

(10) Patent No.: US 6,292,871 B1
(45) Date of Patent: Sep. 18, 2001

(54) LOADING ACCESSED DATA FROM A PREFETCH BUFFER TO A LEAST RECENTLY USED POSITION IN A CACHE

(75) Inventor: Carlos Francisco Fuente, Portsmouth (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/318,171

(22) Filed: May 25, 1999

(30) Foreign Application Priority Data

May 25, 1999 (GB) .................................................. 9905844

(51) Int. Cl.[7] ....................................................... G06F 12/08
(52) U.S. Cl. ............................ 711/136; 711/137; 711/128
(58) Field of Search .................................... 711/137, 136, 711/128

(56) References Cited

U.S. PATENT DOCUMENTS

| 4,980,823 | 12/1990 | Liu ......................................... 711/136 |
| 5,293,609 | * 3/1994 | Shih et al. ............................ 711/137 |
| 5,566,324 | 10/1996 | Kass ...................................... 711/160 |
| 6,138,213 | * 10/2000 | McMinn ................................ 711/137 |

FOREIGN PATENT DOCUMENTS

| 0 449 540 | * 10/1991 | (EP) . |
| WO 93/18459 | * 9/1993 | (WO) . |
| WO 96/30836 | * 10/1996 | (WO) . |

* cited by examiner

*Primary Examiner*—Reginald G. Bragdon
(74) *Attorney, Agent, or Firm*—Casey P. August

(57) ABSTRACT

A cache memory system comprises a cache 4, a prefetch store 5, and a memory controller 3. The controller 3 receives requests from a processor 1 for access to lines of data stored in a memory 2 and maintains priority data indicative of the relative priority of lines of data stored in the cache 4. The controller 3 responds to receipt of a processor request for access to data in a line N such that: for a cache hit, the controller supplies the data from the cache 4 to the processor 1; for a cache miss when line N is not stored in the prefetch store 5, the controller 3 retrieves line N from the memory, and controls storage of the line in the cache 4 and supply of the data to the processor 1, the priority data for line N being set to a high relative priority; for a cache miss when line N is stored in the prefetch store 5, the controller 3 transfers line N from the prefetch store 5 to the cache 4 and supplies the data to the processor 1, the priority data for line N being set to a low relative priority; and for both a cache hit and a cache miss, the controller 3 prefetches the sequentially next line N+1 from the memory 2 to the prefetch store 5. Prefetching is preferably only performed for a defined subset of the lines in the memory.

33 Claims, 2 Drawing Sheets

LOADING ACCESSED DATA FROM A PREFETCH BUFFER TO A LEAST RECENTLY USED POSITION IN A CACHE

FIELD OF THE INVENTION

The present invention relates generally to cache memory systems and provides apparatus and methods for facilitating access by a processor to data stored in a memory.

BACKGROUND OF THE INVENTION

In processing systems such as computers, the data to be utilized by a processor is stored in a main memory and control logic manages the transfer of data between the memory and the processor in response to requests issued by the processor. The data stored in the main memory generally includes both instructions to be executed by the processor and data to be operated on by the processor. For simplicity, both instructions and true data are referred to collectively herein as "data" unless the context otherwise requires. The time taken by a main memory access is relatively long in relation to operating speeds of modern processors. To address this, a cache memory with a shorter access time is generally interposed between the main memory and the processor, and the control logic manages the storage of data retrieved from the main memory in the cache and the supply of data from the cache to the processor. The cache is organized into multiple "lines", each line providing storage for a block, or line, of data from the main memory which may be many bytes in length. When the processor issues a request for data in a line N, the control logic determines whether that line is stored in the cache. If so, ie. if there is a cache hit, the data is retrieved from the cache. If not, ie. if there is a cache miss, the data must be retrieved from the main memory and the processor is stalled while this operation takes place. Since a cache access is much faster than a main memory access, it is clearly desirable to manage the system so as to achieve a high ratio of cache hits to cache misses. Increasing the size of the cache makes this task easier, but cache memory is expensive in comparison to the slower, main memory. It is therefore important to use cache memory space as efficiently as possible.

In conventional cache memory systems, a line of data retrieved from the memory following a cache miss is stored in the cache, overwriting a previously stored line which is selected for eviction by the control logic in accordance with a priority system. The priority system indicates the relative priority of lines of data stored in the cache, with low priority lines being selected for eviction before higher priority lines. The control logic implements the priority system by maintaining priority data indicative of the current priorities of the stored lines various priority systems are known, though the generally favoured technique is a Least Recently Used system where the control logic maintains data indicating relatively how recently lines stored in the cache have been accessed by the processor. The least recently used (LRU) line is selected for eviction first when space is required for a new line, and this line then becomes the most recently used (MRU) line when it is read out to the processor. Whatever the priority system employed, it is desirable to utilize the cache memory space so as to reduce processor stall time due to main memory accesses as far as possible.

In practice, the effectiveness of current cache memory systems is dependent on the nature of the processing application. For example, real time multithreaded applications, such as in a storage controller environment, have an execution profile which is unfriendly to the operation of a conventional cache. Execution of instructions in these environments is driven by external events, such as a new host I/O arriving or a disk I/O completing, and these events tend to occur in a random order. Each event calls for a particular sequence of instructions to be executed a single time. These instructions are not then executed again until the next time that event occurs. The lack of repetition means that a cache will not be effective unless an event repeats within the lifetime of lines stored in the cache. If the set of all events is large, and the code that is executed for each event is mostly unique, then the full set of code will exceed the available cache memory space. Thus, an instruction will only be executed once before it is evicted from the cache and replaced with another instruction for another event. This means that the cache is not effective in improving the instruction throughput of the processor.

One way to improve efficiency of a cache memory system is to attempt to anticipate processor requests and retrieve lines of data from the memory in advance. This technique is known as prefetching. U.S. Pat. No. 5,566,324 discloses such a memory system in which, in the event of a main cache miss, a current line is retrieved from memory and the sequentially next line is retrieved and stored in a prefetch cache. If the prefetched line is requested next by the processor, this line is then loaded to the main cache and supplied to the processor, so that a main memory access is avoided. U.S. Pat. No. 4,980,823 discloses another prefetching system which, rather than using a separate prefetch store as in U.S. Pat. No. 5,566,324, prefetches lines directly into an LRU location of the cache. Known prefetching systems can improve performance to some extent in applications where data lines are called sequentially by the processor. However, in many applications the processing requirements are more complex and the effectiveness of current prefetching systems is limited. The applications described above in relation to a storage controller provide an example. While the use of known prefetching systems in this environment will save some processor stall time for main memory accesses, ie. for the sequentially called lines within a particular section of code, this does not significantly improve the overall efficiency of the memory system.

DISCLOSURE OF THE INVENTION

According to one aspect of the present invention there is provided a cache memory system for facilitating access by a processor to lines of data stored in a memory, the system comprising: a cache for storing lines of data for access by the processor; a prefetch store for storing lines of data to be transferred to the cache; and a memory controller for receiving processor requests for access to lines of data and retrieving lines of data from the memory, the memory controller maintaining priority data indicative of the relative priority of lines of data stored in the cache. The memory controller is configured to respond to receipt of a processor request for access to data in a line N such that: in the case of a cache hit, the memory controller controls supply of that data from the cache to the processor; in the case of a cache miss when line N is not stored in the prefetch store, the memory controller retrieves line N from the memory, and controls storage of the line in the cache and supply of the data to the processor, the priority data for line N being set to a high relative priority; in the case of a cache miss when line N is stored in the prefetch store, the memory controller transfers line N from the prefetch store to the cache and controls supply of the data to the processor, the priority data for line N being set to a low relative priority, and for both a cache hit and a cache miss, the memory controller prefetches the sequentially next line N+1 from the memory to the prefetch store.

Thus, in embodiments of the present invention, prefetching is performed on both a cache hit and a cache miss, and prefetched data lines which are then requested and supplied to the processor are stored in the cache with a lower priority than lines retrieved directly from the main memory. As a result, lines which generally cannot be prefetched successfully are retained in the cache in favour of lines which can be prefetched successfully. Those lines which are called out of sequence, eg. the branch targets for the working set of a piece of code, will therefore tend to be retained in the cache. Because prefetching is performed for cache hits as well as cache misses, a line which can be prefetched successfully is generally always retrieved by prefetching. Thus, in operation of the system, processor stall time for main memory accesses is substantially reduced.

A highly efficient cache memory system is therefore achieved, reducing processor stall time for main memory accesses and allowing a smaller cache to be significantly more effective than previously. For example, considering the system of U.S. Pat. No. 5,566,324 mentioned above, that system performs prefetching only on main cache misses, and prefetched lines which are then requested and supplied to the processor are stored in the main cache conventionally, taking a high priority (MRU) status. Successfully prefetched lines therefore compete for cache space with the more valuable lines which had to be retrieved directly from main memory. Further, lines which could have been prefetched successfully may have to be retrieved directly from memory if the preceding line resulted in a cache hit. Thus, stall time for main memory accesses will be high unless a large cache is employed. Similarly, while U.S. Pat. No. 4,980,823 loads a prefetched line directly to a low priority (LRU) cache location, if that line is then requested by the processor it will then be accorded a high priority (MRU). Again, therefore, successfully prefetched lines compete for cache space with the more valuable lines which had to be accessed directly from main memory, and cache efficiency is limited in comparison to embodiments of the present invention.

In preferred embodiments of the invention the memory controller prefetches line N+1 only for lines in a defined subset of the lines stored in the memory. For example, before implementing a prefetch, the memory controller may perform a test to see if line N+1 (or line N depending on implementation) is in this subset and omit the prefetch for a negative result. The subset of lines for which prefetching is performed can be defined in dependence on the nature of the data lines, in that lines which are deemed suitable for prefetching are included in the subset and lines deemed unsuitable for prefetching are not. The types of lines which are suitable for prefetching will be apparent to those skilled in the art, but as an example, a series of lines which is long, infrequently accessed and in which the lines will be called sequentially is particularly suitable for prefetching. On the other hand, for example, a series of lines which is short, accessed frequently or contains looped instructions is generally unsuitable for prefetching. The subset of prefetchable lines could be defined in the system in various ways, for example by a dedicated flag in the processor request which is detected by the memory controller. In some applications, the subset may be defined dynamically, changing during operation of the system. Preferably, the subset of lines corresponds to a particular region of the memory, the set (or sets) of addresses in this region being defined in the memory controller. In a particularly simple implementation, the subset corresponds to those lines in memory addresses either above or below a defined threshold address, and the memory controller simply checks the line address against the threshold address to determine if a prefetch should be performed.

To reduce prefetch traffic on the system bus, the memory controller preferably performs a prefetch after confirming that the line to be prefetched is not already stored in the cache and/or in the prefetch buffer. If it is, prefetching is unnecessary though operation of the system would otherwise be unaffected if the prefetch step were performed.

The memory controller preferably maintains the priority data in accordance with a Least Recently Used system. In particular, it is preferred that lines supplied from the prefetch buffer to the processor assume LRU status in the cache, and lines loaded directly from the memory to the processor assume MRU status in the cache.

Another aspect of the present invention provides processing apparatus comprising a processor, a memory for storing lines of data to be accessed by the processor, and a cache memory system according to the first aspect of the invention coupled between the processor and the memory. The cache memory system in this apparatus may include one or more of the preferred features mentioned herein.

A further aspect of the present invention provides a method for facilitating access by a processor of a data processing system to lines of data stored in a memory of the system, wherein the system includes a cache for storing lines of data for access by the processor and a prefetch store for storing lines of data to be transferred to the cache, and wherein the processor generates requests for data to which access is required, the method comprising maintaining in the system priority data indicative of the relative priority of lines of data stored in the cache, and responding to a processor request for access to data in a line N by: determining whether line N corresponds to a cache hit or a cache miss; in the case of a cache hit, supplying the requested data to the processor; in the case of a cache miss, determining whether line N is stored in the prefetch store; when line N is not stored in the prefetch store on a cache miss, retrieving line N from the memory, and storing the line in the cache and supplying the requested data to the processor, the priority data for line N being set to a high relative priority; when line N is stored in the prefetch store on a cache miss, transferring line N from the prefetch store to the cache and supplying the requested data to the processor, the priority data for line N being set to a low relative priority; and for both a cache hit and a cache miss, prefetching the sequentially next line N+1 from the memory to the prefetch store.

In general, it is to be understood that, where features are described herein with reference to an apparatus embodying the invention, corresponding features may be provided in a method embodying the invention, and vice versa.

BRIEF DESCRIPTION OF THE DRAWINGS

Preferred embodiments of the invention will now be described, by way of example, with reference to the accompanying drawings in which.

DESCRIPTION OF THE PREFERRED EMBODIMENTS

Figure 1:
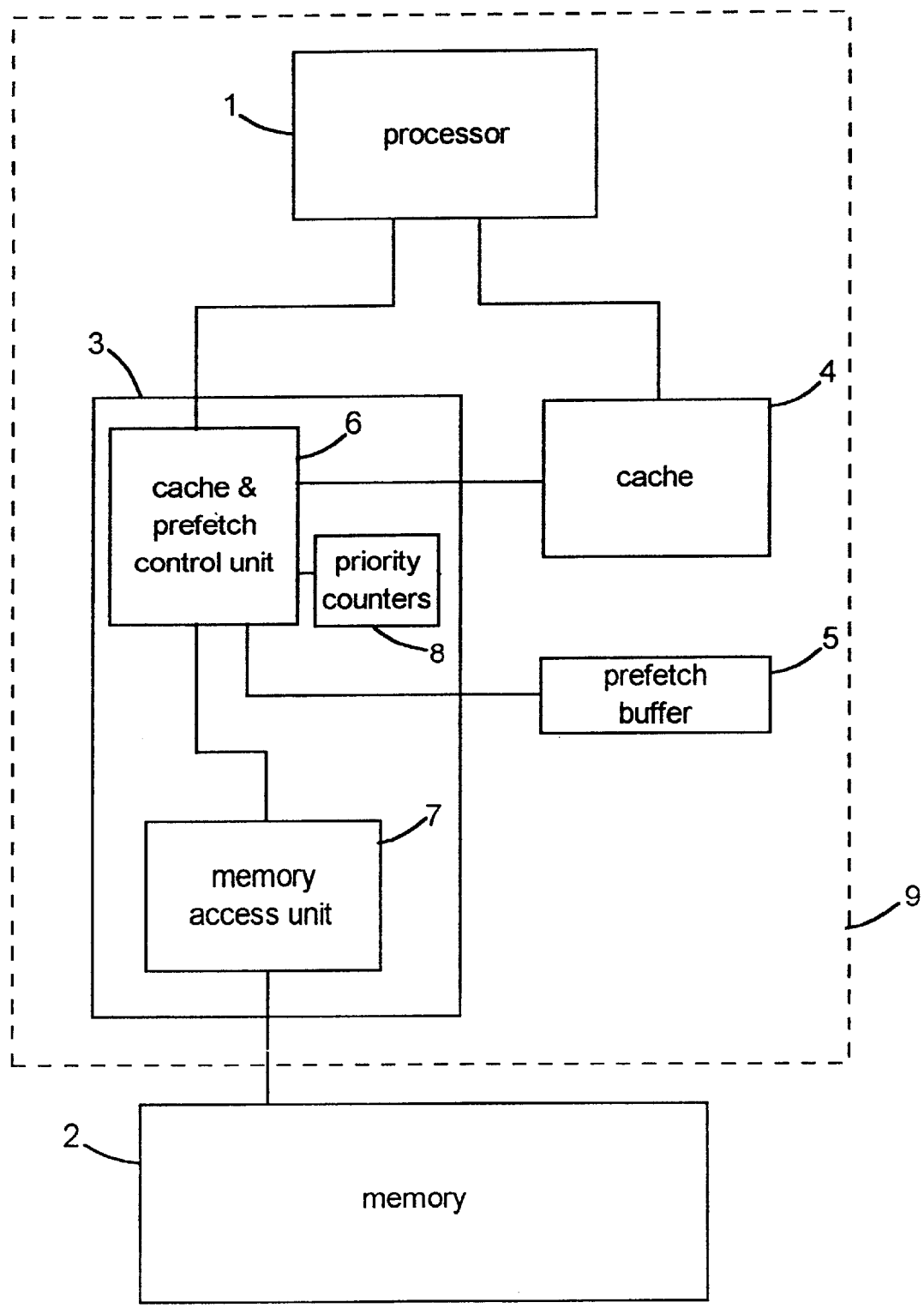
FIG. 1 is a schematic block diagram of processing apparatus embodying the invention.

The processing apparatus of FIG. 1 comprises a processor 1 and a main memory 2, implemented in DRAM, in which lines of data to be used by the processor are stored. A memory controller 3 is connected between the processor 1 and memory 2. A cache 4, implemented in SRAM, is connected to the processor 1 and memory controller 3, and a prefetch store in the form of a prefetch buffer 5 is connected to the memory controller 3. The memory controller 3 comprises logic for controlling the transfer of lines of data from the memory 2 to the processor 1 and the storage of lines of data in the cache 4 and prefetch buffer 5. The logic elements comprise a cache & prefetch control unit 6, a memory access unit 7, and a priority data indicator, in the form of a set of priority counters 8, in which priority data indicating the relative priority of lines of data stored in the cache is maintained by the control unit 6. The logic elements 6 to 8 of the memory controller 3 are connected as shown in the figure, with the cache 4 being connected to the control unit 6 and the prefetch buffer 5 connected to the memory access unit 7. While the logic elements 6 to 8 are shown as separate units in the figure, it will be understood that these elements can be implemented in hardware or software and may be integrated together or with other functional elements. Detailed logic for implementing the various elements will be apparent to those skilled in the art from the following description.

In the present embodiment, the processor 1 is integrated with cache 4, memory controller 3 and prefetch buffer 5 in a microprocessor indicated generally at 9. Here, therefore, cache 4 constitutes a first level cache for the processor 1, though in other embodiments it may be a lower level cache. Also, in other embodiments the memory 2 may be a memory other than the main memory, such as a second level cache.

Modern microprocessors often have separate instruction and data cache systems. The present embodiment will be described in the context of such a system with the cache 4 serving as the instruction cache of the processor. The invention can be applied to particular advantage in such a system but it will be apparent that the invention can also be applied in systems where the cache 4 is not integrated with the processor and/or where the cache is a data cache or is used for both data and instructions.

In this embodiment, the code to be executed by the processor 1 is stored in the memory 2 as a series of blocks or lines of instructions at sequential address locations. The processor 1 generates requests for instructions as they are required for execution. A request indicates the address of the line containing the required instruction and is supplied to the control unit 6. The control unit 6 then determines if the requested line is stored in the cache 4. While the cache 4 could be a direct mapped cache or a fully associative cache, in this embodiment the preferred choice is a set associative cache which is often used in the embedded environment and the control logic for which is relatively simple. In particular, the cache 4 in this embodiment is a 4-way set associative cache which therefore has four cache locations in each of multiple sets of cache lines. Lines stored in the cache 4 are accessed in known manner by the control unit 6 using a tag directory stored in the unit 6. The line address indicates a particular set of the cache, and the tag directory indicates the real address for each line stored in the corresponding set in the cache. In the event of a cache hit, the control unit 6 implements read out of the line from the cache to the processor in known manner.

The control unit 6 also controls the priority counters so that the counts reflect the appropriate relative priority of lines stored in the cache at any time. The priority counters could be implemented in various ways as will be apparent to those skilled in the art. In this preferred embodiment one priority counter 8 is provided for each cache line and the counts are maintained by the control unit 6 in accordance with a least recently used system. In a conventional cache implementing an LRU system, the counts registered by the counters indicate relatively how recently the associated cache lines were accessed by the processor, the lower the count the more recent the access. Each time a line is read out to the processor, the counter associated with that cache line is reset to zero, and all counters (or those counters in the same set for a set associative cache) which register a lower count than that previously registered by the reset counter are incremented by one. Thus, the counter registering a zero count corresponds to the MRU line, and the counter registering the highest count corresponds to the LRU line. Generally the LRU line will be overwritten when space is needed for a storage of a new line, this line then becoming the MRU line, and so on. In the present apparatus, the cache access controller 6 controls the counters 8 in accordance with this known system, but with one important difference in the case of lines loaded to the cache from the prefetch buffer 5 as will be explained below.

The prefetch buffer 5 in this embodiment is a simple store-and-forward buffer which is one cache-line wide. In other embodiments the prefetch store may be a cache or other multiple line storage device, but this is not necessary for successful operation of the system. Further embodiments may integrate the prefetch store with the cache, for example using a dedicated cache location, which is not used for other data, as the prefetch store. However, the present embodiment provides a particularly simple implementation in which the cache is not polluted with prefetched instructions which are not then used by the processor.

The memory access unit 7 operates to access the main memory 2 to retrieve instruction lines when required. When a main memory access is required the control unit 6 supplies the address of the required line to the memory access unit 7. The memory access unit is capable of accessing the memory 2 in two modes which will be referred to herein as a single line mode and a dual line mode. In the single line mode, the unit 7 accesses the memory 2 in the usual way to retrieve a single line at the address supplied by the control unit 6. In the dual line mode, the unit 7 accesses the memory to retrieve two lines, namely the line at the address supplied by the control unit 6 and also the line at the sequentially next address in the memory 2. (As will be apparent to those skilled in the art the dual line mode can be implemented by a DRAM burst mode access in known manner). The appropriate access mode is indicated to the memory access unit by a flag which is set to one of two states by the control unit 6 and is supplied to the memory access unit 7 together with the line address.

In addition to controlling operation of the cache 4 and memory access unit 7, the control unit 6 controls storage and retrieval of lines in the prefetch buffer 5. The prefetch buffer 5 is used for storing lines which have been retrieved from memory 2 in advance of a processor request for access to that line. In particular, in response to a processor request for instructions in a given line, the sequentially next line will be prefetched if certain conditions are satisfied. In this embodiment, prefetching is only performed for lines in an "active region" of the memory 2. The active region in this example is the address region of the memory 2 corresponding to addresses up to a threshold address which is defined in the control unit 6. The threshold address in this embodiment represents the sequentially next address after the last address in the active region, so that the state of a single bit in line addresses indicates whether the line is in the active or inactive region.

In accordance with this embodiment, instructions which are determined at the design stage to be suitable for prefetching are stored in the active region of the memory. Instructions which are identified as unsuitable for prefetching are stored in addresses outside this region. More particularly, during the design stage the system designer can assess the characteristics of separate sections of code (usually a whole function at a time) and classify them according to run length, frequency of invocation, and sequential vs. looping execution. Further, the designer is capable of locating code segments with a fine degree of control. Certain segments of code, such as those which are long, which are largely sequential, which take few long branches forwards, and which are infrequently accessed, are placed in the active region of the memory. Other segments of code, such as those which are short, looping, or accessed frequently are placed in the inactive region. This division of lines between the active and inactive regions of the memory enables the effectiveness of the memory system to be greatly magnified. This is even more so when, as is preferred, the design stage includes deliberately laying out certain code segments for sequential execution, and placing such segments in specific code regions. Using the placement and inlining/straightlining capabilities of modern compiler and linker toolsets, the code can be optimized and suitable code placed in the active region of the memory. This is extremely effective in enabling high performance code execution with a small cache.

Figure 2:
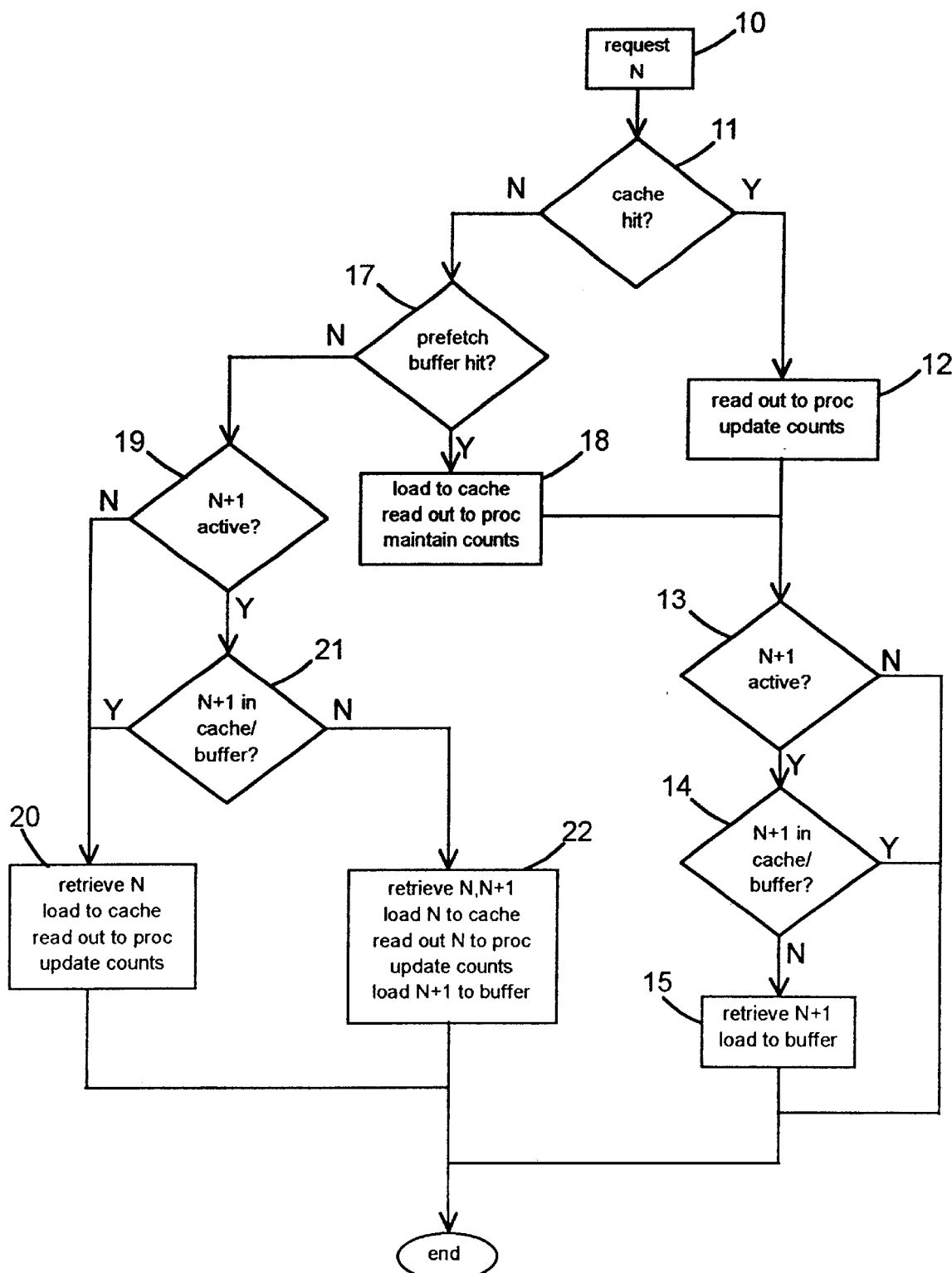
FIG. 2 is a flow chart illustrating operation of the apparatus of FIG. 1.

Operation of the apparatus will now be described in detail with reference to the flowchart of FIG. 2. The process starts at step 10 when the processor 1 issues a request for instructions in a line, say line N. The request is supplied to the control unit 6 which determines, in step 11, whether there is a cache hit. If so, the process proceeds to step 12 in which the control unit 6 accesses the cache so that line N is read out to the processor 1. The control unit then updates the priority counters 8 in the usual way. That is, the counter associated with line N is reset to zero, indicating MRU status, and those counters in the same set of the cache which register a lower count than the value previously held by the reset counter are incremented. Operation then proceeds to step 13 in which the control unit 6 determines whether the sequentially next line N+1 lies in the active region of the memory. This is done by incrementing the requested address for line N to obtain the line N+1 address, and then checking the state of the address bit which corresponds to the threshold of the active region. If the threshold bit is "1", then N+1 is outside the active region and the process is complete. If the threshold bit is "0" then line N is in the active region and operation proceeds to step 14.

In step 14, the control unit 6 checks whether line N+1 is already stored in the cache or the prefetch buffer 5. If so, no further action is required. If not, then the process proceeds to step 15 in which prefetching of line N+1 is performed. Specifically, the control unit 6 supplies the address for line N+1 to the memory access unit 7, setting the mode flag to indicate a single line access mode. The memory access unit then retrieves line N+1 from the memory 2 in known manner and forwards the line to the control unit 6. The control unit 6 loads line N+1 to the prefetch buffer and the operation is complete.

Returning to step 11, if a cache miss is obtained in this step, operation proceeds to step 17 in which the control unit 6 checks whether line N is currently stored in the prefetch buffer 5. If so, ie. for a prefetch buffer hit, the control unit 6 loads line N to the cache. If the appropriate cache set for storing line N is not full, the line will be stored in the next available cache location. Otherwise, the LRU line in the set will be overwritten by line N. Line N is then read out to the processor 1. Normally, when a line is read out to the processor, the priority counters will be updated as described above to reflect the newly accessed line as the MRU line. In this case, however, since line N was supplied from the prefetch buffer 5, line N is to be assigned LRU status. The priority counters are therefore maintained in their previous states, with the Line N counter being set to indicate line N as the LRU line, so the control unit 6 does not need to actively reset the counters in this case. In this way, a line supplied to the processor from the prefetch buffer is stored in the cache with a low priority. From step 18, the operation proceeds to step 13 in which the conditions for prefetching line N+1 are checked and prefetching is performed or not as already described.

Returning to step 17, if there is a prefetch buffer miss here then the currently requested line N is not available from either the cache or the prefetch buffer, and a main memory access is required. Operation then proceeds to step 19 in which the control unit 6 determines whether line N+1 is in the active region of the memory in the same way as step 13. If N+1 is not in the active region, prefetching is not required and operation proceeds to step 20. In step 20, the control unit 6 supplies the address for line N to the memory access unit 7 setting the mode flag to indicate a single line access. The memory access unit 7 retrieves line N from the memory and forwards the line to the control unit 6. The control unit 6 then loads line N to the cache, evicting the LRU line from the appropriate set if all set locations are occupied. Line N is then read out to the processor 1, the priority counters 8 are updated in the usual way to reflect line N as the MRU line, and the operation is complete.

However, if at step 19 it is determined that line N+1 is in the active region, then the process proceeds to step 21 in which, like step 14, the control unit 6 checks whether N+1 is already stored in the cache or the prefetch buffer 5. If so, prefetching is not required and the operation reverts to step 20 and continues as previously described. If there is a negative result at step 21, then both retrieval of line N and prefetching of line N+1 are required, and operation proceeds to step 22. Here, the control unit 6 supplies the address of line N to the memory access unit 7, but this time sets the mode flag to indicate a dual line access. The unit 7 then accesses the memory 2, retrieves line N and forwards this line to the control unit 6. In the same access process the memory access unit then retrieves line N+1 and forwards this line to the control unit 6. On receipt of line N from the memory access unit 7, the control unit loads the line to the cache, overwriting the LRU line in the appropriate set as required, and line N is then read out to the processor 1. The control unit then updates the priority counters in the usual way to reflect line N as the MRU line. On receipt of line N+1 from the memory access unit 7 the control unit stores line N+1 in the prefetch buffer 5, and the operation is complete.

As described above, the apparatus operates to assign lines which are supplied from the prefetch buffer to the processor a low priority, here LRU status, in the cache. Lines which are supplied to the processor following a main memory access for a current request are assigned a high priority, here MRU status, in the cache. Thus lines which have not been successfully prefetched are given precedence in the cache over lines which have been successfully prefetched. This means that the more valuable lines, for which a main memory access was required while the processor was waiting, are retained in the cache in favour of lines which were accessed much more quickly from the prefetch buffer 5. Further, the prefetching of instructions in the active region is performed even for a cache hit on the current instruction. Thus, a line which can be prefetched successfully is generally always retrieved by prefetching, even if the immediately preceding line was already available in the memory controller 3. If prefetching of a line N+1 were only performed on a line N miss, then if N is an instruction which was successfully prefetched previously but had survived in the cache, a request for line N+1 may result in a cache miss, and hence a main memory access, even though N+1 could have been prefetched successfully. Consideration of the above shows that the operation tends to leave the cache containing lines which were not prefetched, these being the lines which had the highest cost in terms of processor stall time. These lines were not called sequentially, and may have been loaded as a result of a branch instruction or an interrupt handler for example. The processor thus perceives less time stalled for main memory accesses and so achieves a higher rate of instructions executed. If the cache 4 is large enough to store all the branch targets for the working set of a piece of code, then the system allows the processor to suffer no stall time in executing instructions, and this with significantly less cache memory space than is required to hold the entire working set of the code. In general, a small cache can be made as effective as a cache several times its size. This is of course beneficial in many applications, and can be of particular assistance in embedded applications where the designer has the opportunity to define the first level memory system but can only afford a small cache in total. Further benefits arise, particularly in the embedded environment, from having just a single, integrated cache as in the apparatus of FIG. 1. This represents a simple design, and saves development time as well as silicon area, which reduces product cost. Thus memory systems embodying the invention can be very effective in enabling high performance processor operation, with a small amount of cache and cheap external memory.

While embodiments of the invention have been described in detail above, it will be apparent to those skilled in the art that many variations and modifications can be made to the embodiments described without departing from the scope of the invention. For example, while a least recently used priority system is adopted in the above apparatus, the same principles can be applied where other priority systems are used. Further, in response to a cache miss for a line requested by the processor in the above apparatus, that line is loaded to a cache location and then read out to the processor. In other embodiments, loading of the cache line and supply of the line to the processor may be performed in parallel, though this would require modification of the usual cache line loader.

What is claimed is:

1. A cache memory system for facilitating access by a processor to lines of data stored in a memory, the system comprising:

a cache for storing lines of data for access by the processor;

a prefetch store for storing lines of data to be transferred to the cache; and a memory controller for receiving processor requests for access to lines of data and retrieving lines of data from the memory, the memory controller maintaining priority data indicative of the relative priority of lines of data stored in the cache;

wherein the memory controller is configured to respond to receipt of a processor request for access to data in a line N such that:

in the case of a cache hit, the memory controller controls supply of that data from the cache to the processor;

in the case of a cache miss when line N is not stored in the prefetch store, the memory controller retrieves line N from the memory, and controls storage of the line in the cache and supply of the data to the processor, the priority data for line N being set to a high relative priority;

in the case of a cache miss when line N is stored in the prefetch store, the memory controller transfers line N from the prefetch store to the cache and controls supply of the data to the processor, the priority data for line N being set to a low relative priority, and for both a cache hit and a cache miss, the memory controller prefetches the sequentially next line N+1 from the memory to the prefetch store.

2. A system according to claim 1 wherein the memory controller is configured to prefetch line N+1 only for lines in a defined subset of the lines stored in the memory.

3. A system according to claim 2 wherein said subset is the set of lines stored in a defined region of the memory.

4. A system according to claim 2 wherein the memory controller is configured to prefetch line N+1 when line N+1 is a line in said subset.

5. A system according to claim 1 wherein the memory controller is configured to prefetch line N+1 only if line N+1 is not stored in the cache.

6. A system according to claim 1 wherein the memory controller is configured to prefetch line N+1 only if line N+1 is not stored in the prefetch store.

7. A system according to claim 1 wherein the memory controller maintains said priority data in accordance with a Least Recently Used system whereby the priority data generally indicates relatively how recently lines stored in the cache have been accessed by the processor.

8. A system according to claim 7 wherein said high relative priority indicates a most recently used line and said low relative priority indicates a least recently used line.

9. A system according to claim 1 wherein the cache comprises a set associative cache.

10. Processing apparatus comprising a processor, a memory for storing lines of data to be accessed by the processor, and a cache memory system connected between the processor and the memory, the cache memory system comprising:

a cache for storing lines of data for access by the processor;

a prefetch store for storing lines of data to be transferred to the cache; and a memory controller for receiving processor requests for access to lines of data and retrieving lines of data from the memory, the memory controller maintaining priority data indicative of the relative priority of lines of data stored in the cache;

wherein the memory controller is configured to respond to receipt of a processor request for access to data in a line N such that:

in the case of a cache hit, the memory controller controls supply of that data from the cache to the processor;

in the case of a cache miss when line N is not stored in the prefetch store, the memory controller retrieves line N from the memory, and controls storage of the line in the cache and supply of the data to the processor, the priority data for line N being set to a high relative priority;

in the case of a cache miss when line N is stored in the prefetch store, the memory controller transfers line N from the prefetch store to the cache and controls supply of the data to the processor, the priority data for line N being set to a low relative priority, and for both a cache hit and a cache miss, the memory controller prefetches the sequentially next line N+1 from the memory to the prefetch store.

11. Apparatus according to claim 10 wherein said cache is a first level cache of the processor.

12. Apparatus according to claim 10 wherein said cache is an instruction cache of the processor.

13. Apparatus according to claim 10 wherein said cache comprises a set associative cache.

14. Apparatus according to claim 10 wherein said memory is a main memory of the processor.

15. Apparatus according to claim 10 wherein the memory controller is configured to prefetch line N+1 only for lines in a defined subset of the lines stored in the memory.

16. Apparatus according to claim 15 wherein said subset is the set of lines stored in a defined region of the memory.

17. Apparatus according to claim 16 wherein lines of data deemed suitable for prefetching are stored in said defined region of the memory, and lines of data deemed unsuitable for prefetching are stored in another region of the memory.

18. Apparatus according to claim 15 wherein the memory controller is configured to prefetch line N+1 when line N+1 is a line in said subset.

19. Apparatus according to claim 10 wherein the memory controller is configured to prefetch line N+1 only if line N+1 is not stored in the cache.

20. Apparatus according to claim 10 wherein the memory controller is configured to prefetch line N+1 only if line N+1 is not stored in the prefetch store.

21. Apparatus according to claim 10 wherein the memory controller maintains said priority data in accordance with a Least Recently Used system whereby the priority data generally indicates relatively how recently lines stored in the cache have been accessed by the processor.

22. Apparatus according to claim 21 wherein said high relative priority indicates a most recently used line and said low relative priority indicates a least recently used line.

23. A method for facilitating access by a processor of a data processing system to lines of data stored in a memory of the system, wherein the system includes a cache for storing lines of data for access by the processor and a prefetch store for storing lines of data to be transferred to the cache, and wherein the processor generates requests for data to which access is required, the method comprising the steps of maintaining in the system priority data indicative of the relative priority of lines of data stored in the cache, and responding to a processor request for access to data in a line N by:

determining whether line N corresponds to a cache hit or a cache miss;

in the case of a cache hit, supplying the requested data to the processor;

in the case of a cache miss, determining whether line N is stored in the prefetch store;

when line N is not stored in the prefetch store on a cache miss, retrieving line N from the memory, and storing the line in the cache and supplying the requested data to the processor, the priority data for line N being set to a high relative priority;

when line N is stored in the prefetch store on a cache miss, transferring line N from the prefetch store to the cache and supplying the requested data to the processor, the priority data for line N being set to a low relative priority; and for both a cache hit and a cache miss, prefetching the sequentially next line N+1 from the memory to the prefetch store.

24. A method according to claim 23 wherein said prefetching of line N+1 is only performed for lines in a defined subset of the lines stored in the memory.

25. A method according to claim 24 wherein said subset is the set of lines stored in a defined region of the memory.

26. A method according to claim 25 including the step of storing lines of data which are suitable for prefetching in said region of the memory and storing lines of data which are unsuitable for prefetching outside said region.

27. A method according to claim 24 wherein prefetching of line N+1 is performed if line N+1 is a line in said subset.

28. A method according to claim 23 wherein prefetching of line N+1 is only performed if line N+1 is not stored in the cache.

29. A method according to claim 23 wherein prefetching of line N+1 is only performed if line N+1 is not stored in the prefetch store.

30. A method according to claim 23 including maintaining said priority data in accordance with a Least Recently Used algorithm whereby the priority data generally indicates relatively how recently lines stored in the cache have been accessed by the processor.

31. A method according to claim 30 wherein said high relative priority indicates a most recently used line and said low relative priority indicates a least recently used line.

32. A method according to claim 23 wherein said lines of data comprise lines of instructions to be implemented by the processor.

33. A method according to claim 32 wherein said prefetching of line N+1 is only performed for lines stored in a defined region of the memory, and wherein the method includes the step of configuring said lines of instructions for sequential execution and storing said lines in said region of the memory.

* * * * *